United States Patent
Jaramillo et al.

(10) Patent No.: US 10,705,700 B2
(45) Date of Patent: *Jul. 7, 2020

(54) MIRROR SNAPPING DURING VECTOR DRAWING

(71) Applicant: Adobe Inc., San Jose, CA (US)

(72) Inventors: Narciso Batacan Jaramillo, Piedmont, CA (US); Tomas Krcha, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/245,036

(22) Filed: Jan. 10, 2019

(65) Prior Publication Data

US 2019/0146662 A1 May 16, 2019

Related U.S. Application Data

(63) Continuation of application No. 15/256,327, filed on Sep. 2, 2016, now Pat. No. 10,216,389.

(51) Int. Cl.
*G06F 3/0484* (2013.01)
*G06T 11/20* (2006.01)

(52) U.S. Cl.
CPC ........ *G06F 3/04845* (2013.01); *G06T 11/203* (2013.01); *G06T 2200/24* (2013.01)

(58) Field of Classification Search
None
See application file for complete search history.

(56) References Cited

U.S. PATENT DOCUMENTS

2006/0244754 A1 11/2006 Beda et al.
2014/0354662 A1 12/2014 Saito

OTHER PUBLICATIONS

VISIO 2010 Introduction, URL: https://www.microsofttraining.net/download/manuals!Visio-201 0-Introduction-Best-STL-Training-Manual.pdf, all pages.
Reflections, https://www.rcboe.org/cms/lib01 O/GA01903614/Centricity/Domain/1 030/Reflections.pdf, 2014, all pages.
20 Design Tutorial, URL: http://resources.hwb.wales.gov.uk!VTC/ngfl/dandt/75/Tutorials/2D%20Design/Section1.pdf, all pages, 2015.

*Primary Examiner* — Frank S Chen
(74) *Attorney, Agent, or Firm* — Shook, Hardy & Bacon, L.L.P.

(57) ABSTRACT

Embodiments of the present invention are directed at providing a mirror snapping system for selecting candidate snap points as endpoints for path segments with symmetry in a created image. In one embodiment, generating candidate snap locations from a newly created path segment can be accomplished by automatically constructing an axis of symmetry for the newly created path segment and reflecting created path segment endpoints in the design across the axis of symmetry. In a further embodiment, upon selection of a candidate snap location as the anchored endpoint for an unanchored endpoint of a path segment, line parameters associated with the candidate snap location can be implemented in the path segment. Such parameters can include weight, color, and curvature of the path segment. Other embodiments may be described and/or claimed.

20 Claims, 9 Drawing Sheets

MIRROR SNAPPING DURING VECTOR DRAWING

CROSS-REFERENCE TO RELATED APPLICATIONS

This application is a continuation of and claims priority to U.S. application Ser. No. 15/256,327, filed Sep. 2, 2016, entitled "Mirror Snapping During Vector Drawing," which is assigned or under obligation of assignment to the same entity as this application, the entire contents of each application being herein incorporated by reference.

BACKGROUND

Content designers can utilize vector drawing to create content such as images. Often, aspects of the resulting images are symmetrical in nature; however, images can also contain asymmetrical portions. For example, content depicting an image of an arrow or an image of a microphone might be bilaterally symmetrical, whereas an image of a house might be predominantly symmetrical, excluding, for example, a chimney.

As content designers generally desire to create symmetrical or partially symmetrical images, it is helpful to have drawing tools that aid in the creation of symmetrical or partially symmetrical images. Under the current state of the art, however, a content designer is limited in the methods available for easily creating symmetrical designs. One method available requires a content designer to draw part of an image and then copy and reflect that part of the image around a specified axis. However, this approach requires the content designer to select a specific axis of symmetry after drawing only a portion of the image, and it prevents the content designer from visualizing the overall shape of an image while it is being created. Another method available is activating a mode in which the content designer specifies an axis of symmetry and then draws part of an image while another part of the image is automatically mirrored across the axis of symmetry. Both of these methods, however, require a content designer to specifically and precisely specify an axis of symmetry in an exact location, either before or after drawing. In addition, only one or two axes of symmetry are used at a time, and the symmetry is assumed to apply to the design as a whole. Because images are not always fully symmetrical, these methods can require multiple interactions by a content designer to achieve the desired result, which is time consuming and interrupts the content designer's workflow.

SUMMARY

Embodiments of the present invention are directed towards implementing mirror snapping during vector drawing that is capable of allowing a user to free-hand draw an image and still achieve a symmetrical shape. These embodiments allow a user to create highly symmetrical images without the need to select an axis of symmetry while creating an image. Additionally, multiple axes of symmetry can be utilized to guide the creation of an image where not all axes of symmetry are applied to each portion of a design as a whole.

To accomplish this, the mirror snapping system is configured to generate a list of candidate snap locations. Candidate snap locations identify possible new path segment endpoint locations that are symmetrical with one or more previously created path segments of an image. In some embodiments, candidate snap locations are identified by reflecting endpoints of created path segments across certain axes of symmetry of a new path segment added to an image. Based on these candidate snap locations, when a user is creating a new path segment and moves an unanchored endpoint of the new path segment within a predetermined level of proximity to a candidate snap location, the unanchored endpoint of the new path segment can be snapped, or automatically positioned, to the proximate candidate snap location. An anchored endpoint is an endpoint placed by a user that does not move and an unanchored endpoint is an endpoint moved by the user to complete a path segment. When the user places an unanchored endpoint at a final location, the unanchored endpoint becomes an anchored endpoint. Because of this, a user who creates content designs can draw free-hand using candidate snap locations and quickly achieve a symmetrical, or semi-symmetrical, shape.

DETAILED DESCRIPTION

Figure 1:
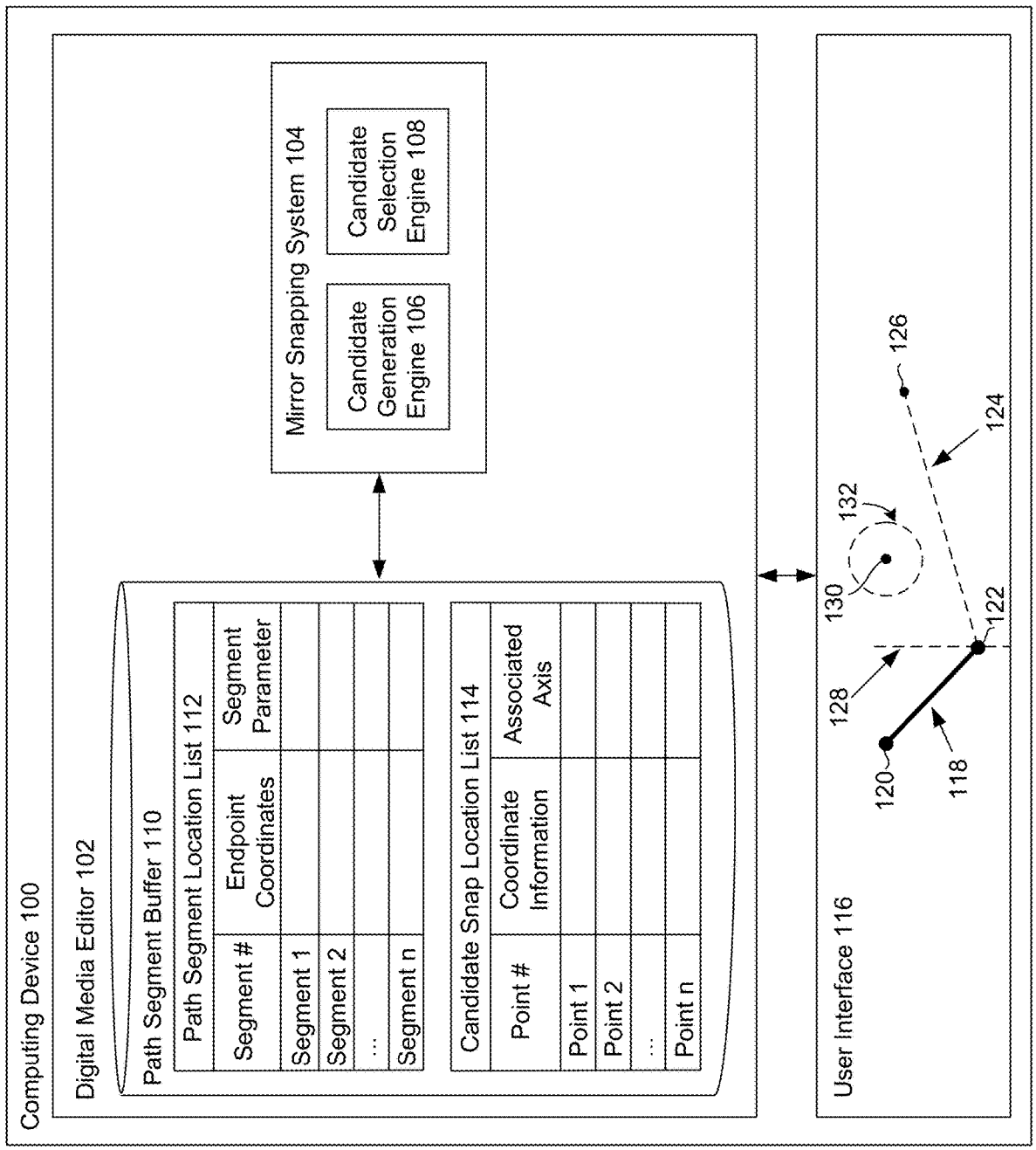
FIG. 1 depicts aspects of an illustrative computing device for implementing a mirror snapping system, in accordance with various embodiments of the present disclosure.

Tools that help users create symmetrical designs are useful for creating images. Without such tools, creating a highly symmetrical design can be a time consuming process. Currently, a user can use vector drawing tools after creating a portion of a shape to copy and reflect the created portion across an axis specified by the user. Alternatively, a user can use a mode in which the user specifies an axis of symmetry and then creates portions of the shape that are automatically mirrored across the designated axis. However, both of these approaches require a user to specifically and precisely designate the location of an axis of symmetry either before creating any part of a shape or after drawing a portion of a shape. Additionally, these approaches only handle one or two axes of symmetry at a time. This means that if a user has a highly complex shape with multiple symmetries in different portions, it is difficult to create the image quickly using the current approaches. Further, these approaches assume that the axes of symmetry are global across the whole image. Because images are not always fully symmetrical, it can take users multiple interactions using the current tools to create the desired design.

Embodiments of the present invention are directed towards efficient mirror snapping during vector drawing. In particular, implementing mirror snapping during vector drawing enables a user to free-hand draw an image and automatically achieve a symmetrical shape. Advantageously, a user does not need to explicitly select or guide constraints of an axis of reflection. Additionally, multiple axes of symmetry can be utilized to guide the creation of an image where not all axes of symmetry are applied to each portion of a design in its entirety.

In implementation, a mirror snapping system utilizes a list of generated candidate snap locations to aid a user in creating symmetrical images. Candidate snap locations are derived from points on an image that are reflected across various axes of symmetry. The candidate snap locations are suggested endpoint locations for placing an unanchored endpoint of a path segment so that the path segment shares some aspect of symmetry with previously created path segments in an image. Path segments, or segments, refer to created portions of an image. It should be appreciated that path segments can be straight, curved, or both straight and curved. An anchored endpoint is an endpoint of a path segment placed that does not move and an unanchored endpoint is an endpoint that has not yet been placed in a final location. When an unanchored endpoint is placed at a final location, the unanchored endpoint becomes an anchored endpoint. Such candidate snap locations can be used to guide the symmetry of a user's image as subsequent path segments are added to the design. This allows a user to quickly draw symmetrical shapes without having to plan the specific symmetries in advance of actual drawing. Also, because the snap locations are suggestions rather than constraints, a user is free to draw shapes that are only partially symmetric, using the suggestions only as desired By way of example, and with brief reference to FIG. 1, an example of the use of candidate snap locations to place a path segment in symmetry with an aspect of a previously created path segment is described. Path segment 118 is a previously created path segment. Candidate generation engine 106 uses endpoints 120 and 122 of path segment 118, along with axes of symmetry such as axis of symmetry 128, to generate candidate snap locations such as candidate snap location 130. When a user begins creating unfinished path segment 124, candidate snap location 130 can be suggested as a location to anchor unanchored endpoint 126. If unanchored endpoint 126 is anchored at candidate snap location 130, the resulting image is path segment 118 in symmetry with path segment 124 as reflected across axis of symmetry 128. Whether and when candidate snap location 130 is suggested to a user can vary in different embodiments. For example, all candidate snap locations might be shown or hidden via a user gesture, or only candidates that are within a sufficient proximity to the current position of the unanchored endpoint might be shown at any given time.

To generate candidate snap locations, the mirror snapping system implements functionality that can utilize information about a created path segment(s) that is completed prior to a path segment currently being drawn (an unfinished path segment). Such candidate snap locations can then be used to suggest endpoints for the path segment currently being drawn, also referred to herein as an unfinished path segment. An unfinished path segment refers to a path segment that is in the process of being created, where a first endpoint is anchored and a second endpoint is unanchored. Created path segments can refer to completed, or finished, path segments where both endpoints are anchored. In this regard, a created path segment is a path segment that has been input and captured prior to an unfinished path segment. As described herein, created path segments include a newly created path segment and previously created path segments. A newly created path segment generally refers to a path segment where both endpoints are anchored and no subsequent path segment has been completed. In other words, a newly created path segment is the most recently completed path segment or the path segment created immediately prior to beginning an unfinished path segment. Previously created path segments refer to path segments created, or completed, prior to the newly created path segment.

In embodiments, generating candidate snap locations from a newly created path segment can be accomplished, for example, by constructing a perpendicular bisector for the newly created path segment and reflecting previously created path segment endpoints in the design across the perpendicular bisector, thus utilizing the perpendicular bisector as a potential axis of symmetry for the design. In another embodiment, an endpoint of a newly created path segment can be used to generate candidate snap locations by constructing axes of symmetry through the path segment endpoint and reflecting created path segment endpoints across the axes of symmetry. Such axes can include vertical orientation, horizontal orientation, at a predefined angle, or at angles related to other segments already drawn, such as if a number of path segments in a drawing are tilted at 30 degrees from vertical,. It should be appreciated, however, that in embodiments, the orientation of an axis can be in relation to an angle of a path segment or any other predefined angle. As subsequent path segments are added to an image, the list of candidate snap locations is capable of being dynamically updated by the mirror snapping system to reflect newly generated candidate snap locations. It should be appreciated that candidate snap locations can be generated and stored for previously created path segments in addition to a newly created path segment when the newly created path segment is added to an image.

While creating an unfinished path segment, the list of candidate snap locations can guide a user's placement of the location where to anchor the unanchored endpoint of the unfinished path segment. A candidate snap location can be suggested as the location to anchor an unanchored endpoint when the unanchored endpoint moves within a predetermined proximity to the candidate snap location. A user can choose whether or not to anchor the unanchored endpoint at a suggested candidate snap location.

Upon selection of a candidate snap location, path segment parameters can be implemented in the newly created path segment. The path segment parameters indicate properties of the created path segment from which an endpoint was reflected to create the suggested candidate snap location. The parameter can be utilized to reflect the properties of the created path segment to the new path segment if the unanchored endpoint is placed at the suggested candidate snap location. For instance, such parameters can include weight, color, and curvature.

The mirror snapping system, as described, enables a user to generate free-hand drawn vector artwork with symmetrical aspects by snapping unanchored endpoints of path segments to candidate snap locations thereby creating a symmetrical image. This allows a user to spend less time creating such images while still ensuring that the images are highly symmetrical.

Figure 9:
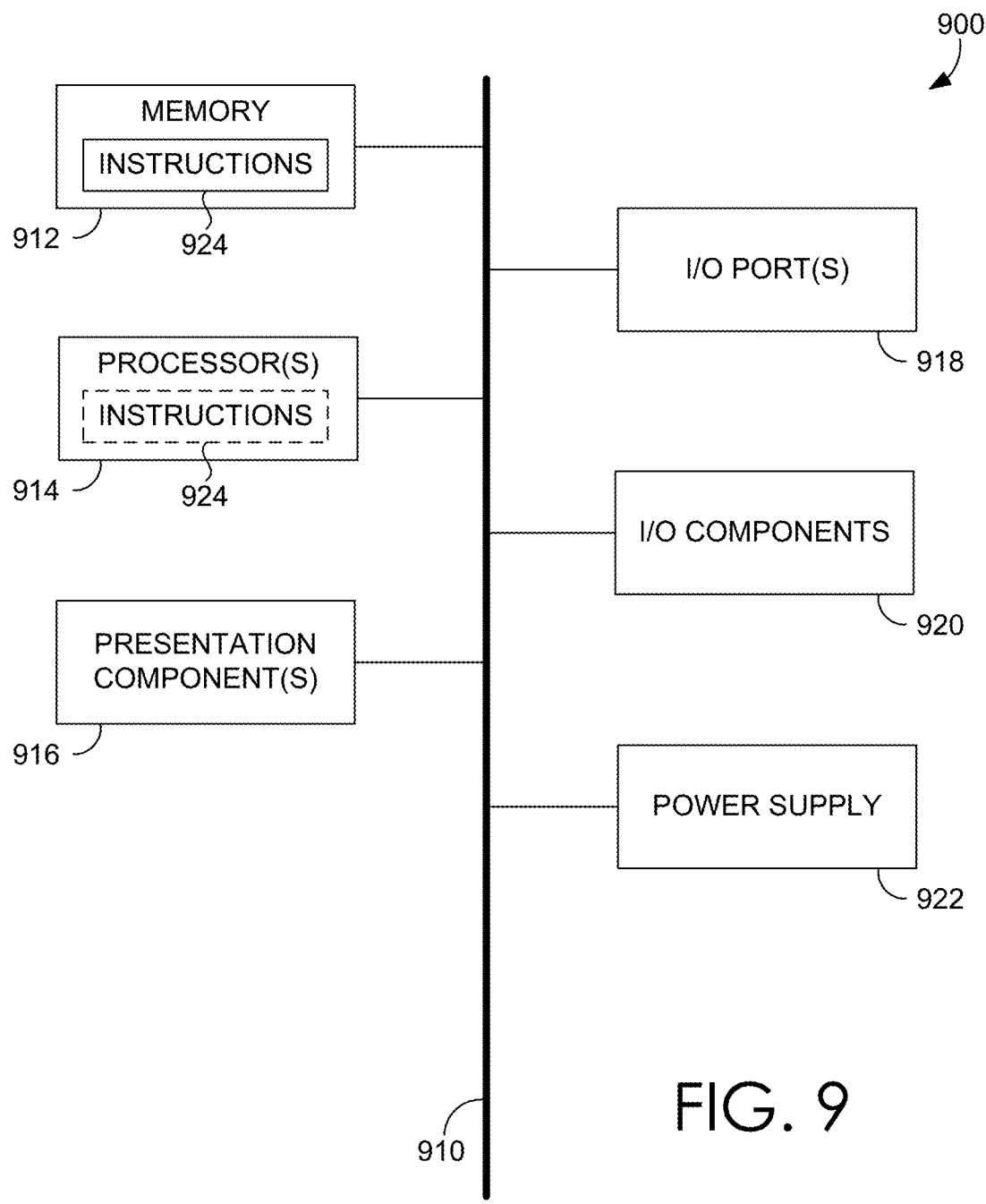
FIG. 9 is a block diagram of an example computing device in which embodiments of the present disclosure may be employed.

FIG. 1 depicts an example configuration of an illustrative computing device 100 for implementing a mirror snapping system 104, in accordance with various embodiments of the present disclosure. Computing device 100 can be any type of computing device, an example of which is depicted in FIG. 9. As depicted, computing device 100 includes a digital media editor 102 and a user interface 116.

Digital media editor 102 can be any editor capable of allowing vector drawing. As used herein, vector drawing can include 2D and 3D vector drawing. Digital media editor 102 can be any suitable digital media editor configured to edit vector drawings. Examples of digital media editor can include ADOBE® Illustrator, ADOBE® Photoshop, ADOBE® InDesign (all available from Adobe Systems, Inc. of San Jose, Calif.), or any other suitable digital media editor.

Digital media editor 102 includes, among other things, a path segment buffer 110 and a mirror snapping system 104. Although path segment buffer 110 and mirror snapping system 104 are illustrated as separate components, they can be any number of components. Path segment buffer 110 depicts a repository for storing data detailing information about path segments and candidate snap locations created in digital media editor 102 on computing device 100. While referred to herein as a buffer, it will be appreciated that the path segment buffer can take the form of any other suitable digital storage medium.

In one embodiment, path segment buffer 110 stores information generated by candidate generation engine 106 using path segment location list 112. For example, path segment location list 112 can include a number associated with a created path segment, coordinates of the path segment endpoints, and path segment parameters defining the path segment such as weight, color and curvature. As can be appreciated, any number or types of details related to path segments can be captured in path segment location list 112.

Path segment buffer 110 can also store candidate snap locations. Candidate snap locations refer to suggested endpoint locations for anchoring an endpoint of an unfinished path segment so that the path segment shares some aspect of symmetry with a created path segment(s) in an image. Path segment buffer 110 can store candidate snap locations generated by candidate generation engine 106 via the candidate snap location list 114. For example, candidate snap locations can be stored with an assigned number as well as coordinate information of the candidate snap location that can include the coordinates of the candidate snap location and a path segment parameter(s) such as weight, color, and/or curvature of the path segment. The path segment parameter indicates properties of the created path segment from which an endpoint was reflected to create the suggested candidate snap location. The parameter can be utilized to reflect the properties of the created path segment to the unfinished path segment if the unanchored endpoint is placed at the suggested candidate snap location. In some cases, candidate snap locations can also be linked with associated axis of symmetry indicating the axis of symmetry across which an existing endpoint from a created path segment in an image was reflected to generate the corresponding candidate snap location.

Path segment buffer 110 can communicate with the mirror snapping system 104, for example, to obtain and/or provide path segment and candidate snap location data. Mirror snapping system 104 is configured to generate candidate snap locations for a user of digital media editor 102 to utilize as locations of potential symmetry when adding path segments to an image. In an embodiment, to accomplish the identification of candidate snap locations, mirror snapping system 104 includes a candidate generation engine 106. Example processes or procedures that can be carried out by candidate generation engine 106 are described in more detail below in reference to FIGS. 2 and 4.

Candidate generation engine generally receives input from a user using a digital media editor (e.g., creating an image in digital media editor 102 via user interface 116) including information about created path segments. For instance, as depicted, path segment 118 is a path segment created by a user. Data about such a path segment can be stored, for instance, via path segment location list 112 of path segment buffer 110. Candidate generation engine can also determine associated information for such a path segment to send to path segment location list 112, such information can include path segment endpoint coordinates and path segment parameters such as weight, color, and curvature.

Using the path segment data, candidate generation engine 106 can generate a set of candidate snap locations. Generated candidate snap locations can be utilized to suggest placement of an unanchored endpoint of a new path segment, such as endpoint 126 of path segment 124. As described, such generated candidate snap locations can be stored by path segment buffer 110 in candidate snap location list 114.

Candidate snap locations can be generated in any number of ways. As one example, candidate snap locations can be generated by constructing an axis of symmetry for a newly created path segment and then reflecting created path segment endpoints across the constructed axis of symmetry. As depicted, axis of symmetry 128 is constructed vertically at endpoint 122 for path segment 118. In this depiction, the orientation of the axis is in relation with the overall global orientation of the image being created, not in relation to created path segment 118. It should be appreciated, however, that in embodiments, the orientation of an axis can be in relation to the angle of a path segment or any other predefined angle. Endpoint 120 of path segment 118 is reflected across axis of symmetry 128 to generate candidate snap location 130. Path segment buffer 110 can store such generated candidate snap locations in candidate snap location list 114.

Additional candidate snap locations can be generated by constructing additional axes of symmetry through an endpoint of a newly created path segment and then reflecting endpoints of created path segments across the axes of symmetry. For example, additional axes could be constructed horizontally or at a predefined angle. In further embodiments, candidate snap locations can be generated by constructing an axis through the perpendicular bisector of a newly created path segment and reflecting endpoints of created path segments across the axis.

In addition to generating and/or providing candidate snap locations, candidate generation engine 106 can also generate and/or provide additional information associated with generated candidate snap locations. Such information can include, for example, an assigned number and the associated axis of symmetry across which an endpoint from a created path segment in an image was reflected to create the candidate snap location. Such as axis of symmetry can be displayed to a user when the associated candidate snap location is suggested to the user as an endpoint for an unfinished path segment being created in a digital media editor (e.g. digital media editor 102). Other information can include coordinate information including a value of at least one path segment parameter such as weight, color, and curvature. The parameter indicates a property of the created path segment that the candidate snap location was generated from. This is discussed further in relationship to FIGS. 5, 6, and 7.

Although generally described herein as generating candidate snap locations in association with mirror snapping, a candidate generation can also generate candidate snap locations for other reasons besides mirror snapping. For example, candidate snap locations can be generated for suggesting locations of where to anchor an unanchored endpoint of an unfinished path segment to align the unfinished path segment horizontally or vertically with a created path segment endpoint or other features. Candidate generation engine can also generate candidate control points for guiding the creation of symmetrical curves. Such generation is discussed further in reference to FIG. 7. In such cases, the candidate selection engine can handle all these various candidate locations, not just the candidate snap locations generated through mirror snapping.

In embodiments, mirror snapping system 104 also includes a candidate selection engine 108. Candidate selection engine 108 is generally configured to detect user movement of an unanchored endpoint of an unfinished path segment. When the user movement is within a predetermined proximity to a candidate snap location, candidate selection engine can notify the user of the proximity. Such notification can occur by automatically moving, or "snapping," the unanchored endpoint of the unfinished path segment to the suggested candidate snap location. Alternatively, such notification can occur by displaying the suggested candidate snap location to the user as a suggested endpoint to anchor the unanchored endpoint of the unfinished path segment.

Candidate selection engine 108 can use information related to user movement of an unanchored endpoint of an unfinished path segment being created via, for example, user interface 116 to suggest a candidate snap location. The candidate selection engine 108 can compare the coordinates of the user movement with candidate snap location list 112. When a user movement comes within a predetermined proximity to a candidate snap location, candidate selection engine 108 can cause the unanchored endpoint of a new path segment being created to automatically move to the candidate snap location. When the location of the user movement changes, candidate selection engine 108 compares the changed location of the unanchored endpoint of the unfinished path segment being created with candidate snap location list 112. In further embodiments, candidate selection engine 108 also takes into account the location of the anchored endpoint of the unfinished path segment in selecting a suggested candidate snap location.

As depicted in FIG. 1, path segment 124 is an unfinished path segment being created via user interface 116. Unfinished path segment 124 shares endpoint 122 with created path segment 118. For path segment 124, endpoint 122 is the anchored endpoint placed by the user and endpoint 126 is the unanchored endpoint that the user is able to move until selecting a final endpoint location for placement. Candidate snap location 130 is determined by candidate generation engine 106 and stored in candidate snap location list 114 upon completion of path segment 118. Predetermined proximity 132 depicts the area within which endpoint 126 needs to be moved by the user for candidate snap location 130 to be suggested as the location for endpoint 126. Candidate snap location 130 is not displayed to a user via user interface 116 until endpoint 126 is moved within predetermined proximity 132. In the depicted embodiment, predetermined proximity 132 is not displayed to the user via user interface 116 but it should be appreciated that in further embodiments such a predetermined proximity can be displayed. Various embodiments for suggesting candidate snap locations are further discussed in reference to FIGS. 3, 5, 6, 7, and 8.

An indication of an axis of symmetry for a candidate snap point may also be displayed on user interface 116. In some embodiments, a user can adjust the axis of symmetry or control the number of axes shown if the displayed axes are over a predefined number. As depicted in FIG. 1, vertical axis of symmetry 128 can be displayed to the user if candidate snap location 130 is suggested to the user as the location to anchor endpoint 126 of path segment 124. Example processes or procedures that can be carried out by candidate selection engine 108 are described in more detail in reference to FIGS. 3 and 5.

Further configurations of candidate selection engine 108 apply coordinate information associated with a selected candidate snap location. Coordinate information can include information indicating, for example, a value of a path segment parameter, for example, path segment weight, color, or curvature. Such values coordinate with the path segment parameters associated with the path segment from which the selected candidate snap location was generated. As depicted, if path segment 124 is ended at candidate snap location 130, the path segment parameters from path segment 118 can also be applied to path segment 124. For instance, weight of path segment 118 can be applied to path segment 124.

Figure 2:
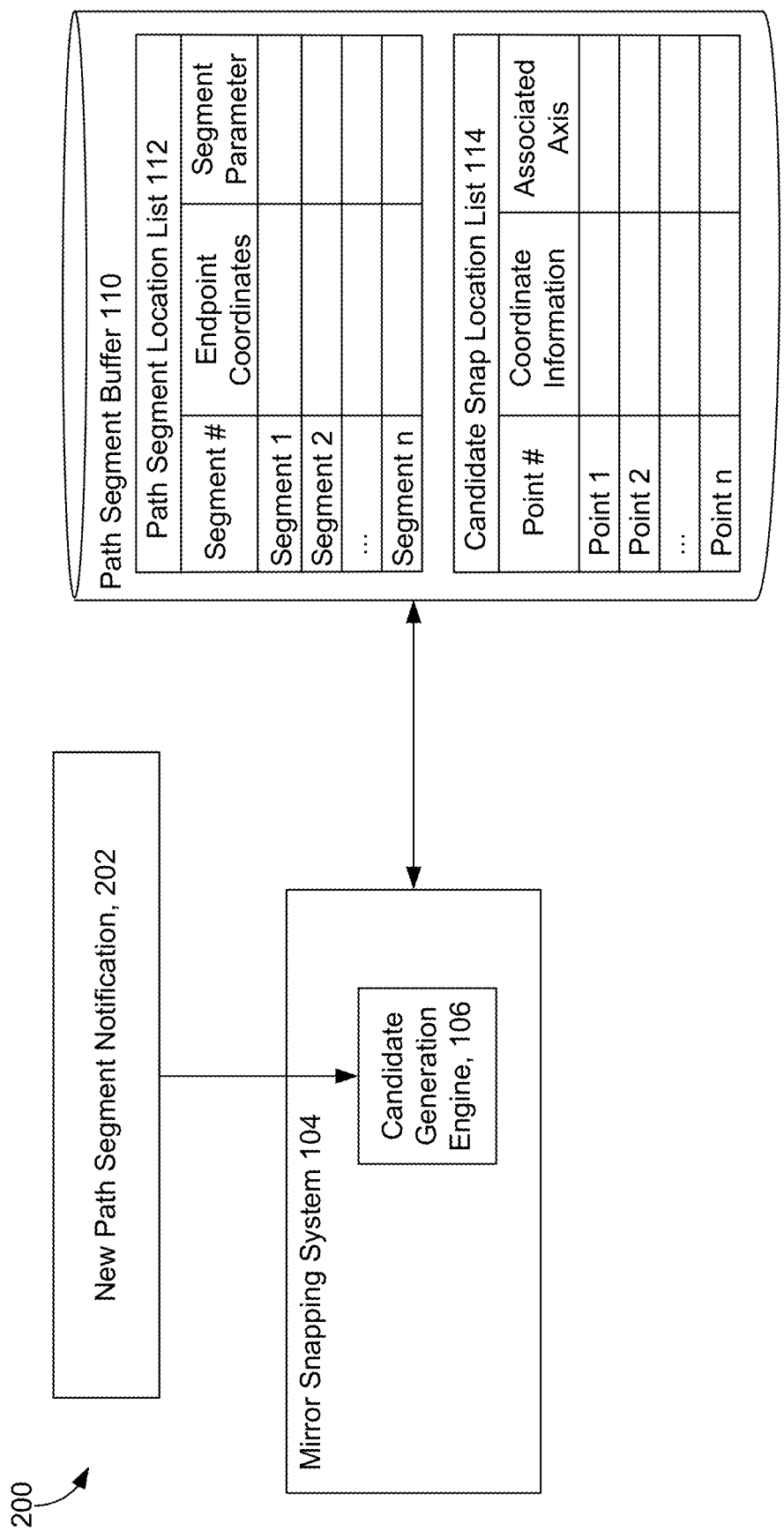
FIG. 2 depicts aspects of the illustrative mirror snapping system of FIG. 1 performing candidate snap location generation, in accordance with various embodiments of the present disclosure.

FIG. 2 depicts aspects of the illustrative mirror snapping system 104 of FIG. 1 performing a candidate snap location analysis 200, in accordance with various embodiments of the present disclosure. Because FIG. 2 depicts aspects of mirror snapping system 104 of FIG. 1, components with like numbering to that represented in FIG. 1 are intended to represent the same or similar components to those discusses in reference to FIG. 1. As depicted, candidate snap location analysis 200 can include, among other components, candidate generation engine 106 and path segment buffer 110.

As discussed above in reference to FIG. 1, candidate generation engine 106 can be configured to receive a newly created path segment notification indicating that a path segment has been created using a digital media editor (e.g. digital media editor 102). In response to receiving the notification, candidate generation engine 106 can extract data relating to the newly created path segment and store the information in path segment buffer 110. Path segment buffer 110 contains information relating to path segments including, for example, endpoint coordinates and path segment parameters such as weight, color and curvature. The extracted data relating to the newly created path segment can be used along with the information stored in path segment buffer 110 related to previously created path segments to generate candidate snap locations.

Upon generation of candidate snap locations, path segment buffer 110 can also store information about the candidate snap locations. Such information can include coordinate information, such as the coordinates of generated candidate snap locations, and path segment parameters such as weight, color, and curvature. Path segment buffer 110 can also store information relating to the associated axis of symmetry across which an endpoint from a created path segment was reflected to create the candidate snap location.

As depicted, mirror snapping system 104 is configured to receive a new path segment notification 202. Such a notification can be received, for example, in response to a user of a digital media editor (e.g. digital media editor 102) clicking with a drawing tool to anchor the unanchored endpoint of an unfinished path segment. As soon as the unanchored endpoint of the unfinished path segment is anchored, the path segment becomes a newly created path segment. Such a notification can be received by candidate generation engine 106. In embodiments, new path segment notification 202 can include information regarding the coordinates of the endpoints of the path segment and path segment parameters such as weight, color, and curvature. Candidate generation engine 106 can extract such information from new path segment notification 202 and send it to path segment buffer 110 to be stored in path segment location list 112.

In further embodiments, candidate generation engine 106 utilizes information stored in path segment location list 112 along with the information extracted from new path segment notification 202 to generate candidate snap locations. The newly generated candidate snap locations can then be used to update candidate snap location list 114. To accomplish this, candidate generation engine 106 can utilize the coordinates of the endpoints of created path segments stored in path segment location list 112 and reflect the endpoints across predetermined axes of symmetry associated with the newly created path segment from new path segment notification 202. The locations where the path segment endpoints are reflected across the axes of symmetry are candidate snap locations. Axes of symmetry can be constructed at an endpoint or at the perpendicular bisector of the new path segment. Such axes can be vertical, horizontal, at a predefined angle, or at angles related to other path segments already created. In one embodiment, the orientation of the axis is in relation to the overall created image, not in relation to the newly created path segment. In another embodiment, the orientation of the axis is in relation to the newly created path segment. It should be appreciated that candidate snap locations can also be generated and stored for previously created path segments in addition to a newly created path segment when the newly created path segment is added to an image.

Figure 3:
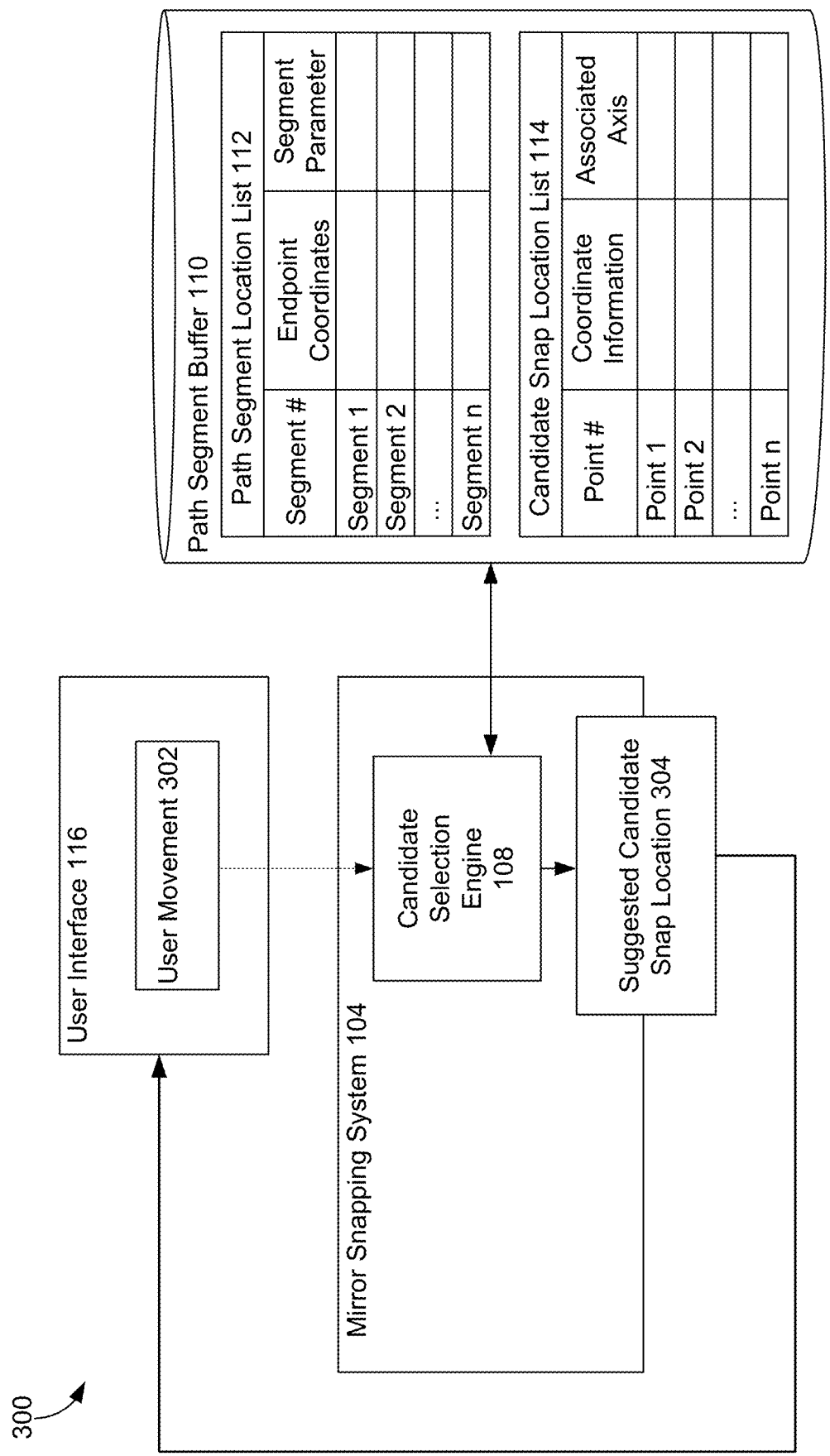
FIG. 3 depicts aspects of the illustrative mirror snapping system of FIG. 1 performing a user movement proximity analysis in regards to candidate snap locations, in accordance with various embodiments of the present disclosure.

FIG. 3 depicts aspects of the illustrative mirror snapping system 104 of FIG. 1 performing a selection of a suggested candidate snap locations, in accordance with various embodiments of the present disclosure. Because FIG. 3 depicts aspects of mirror snapping system 104 of FIG. 1, components with like numbering to that represented in FIG. 1 are intended to represent the same or similar components to those discusses in reference to FIG. 1. As depicted, suggested candidate snap location analysis 300 can include, among other components, candidate selection engine 108 and path segment buffer 110.

As discussed above in reference to FIG. 1, candidate selection engine 108 can be configured to compare the location of a user movement with information stored in path segment buffer 110—for example, the information found in candidate snap location list 114. Such information can include information related to candidate snap locations such as the number assigned to a candidate snap location, coordinate information including the coordinates of the candidate snap location and path segment parameters such as weight, color, and curvature, and the associated axis of symmetry across which an endpoint from a created path segment was reflected to create the candidate snap location.

Mirror snapping system 104 can be configured to detect user movement 302. Such movement can be detected, for example, in response to movement by a user utilizing a user interface of a digital media editor (e.g. user interface 116 of digital media editor 102) of an unanchored endpoint of an unfinished path segment after clicking with a drawing tool to anchor a first endpoint of the unfinished path segment. The drawing tool can include any vector drawing tool, for instance, the pen tool in ADOBE® Illustrator. As depicted, a detected movement by a user can be received by candidate selection engine 108. It should be appreciated that user movement can be inputted using, for instance, a mouse, a finger, or a similar device. In embodiments, user movement 302 can include the location of the anchored endpoint and the current location of the unanchored endpoint of the unfinished path segment being created utilizing a drawing tool in a digital media editor.

Once candidate selection engine 108 detects the current location of the unanchored endpoint of the unfinished path segment being created, the location can be compared with the candidate snap locations utilizing candidate snap location list 114 within path segment buffer 110. In an embodiment, candidate selection engine 108 utilizes an area of predetermined proximity around the candidate snap locations to select a candidate snap location as a suggested endpoint. Upon selecting a suggested candidate snap location, candidate selection engine 108 outputs suggested candidate snap location 304 to user interface 116. In one embodiment, the suggested candidate snap location is displayed to a user via user interface 116. The user can utilize the displayed suggested candidate snap location to anchor the unanchored endpoint of the unfinished path segment being created. It should be appreciated that more than one candidate snap location can be suggested to a user as a location to anchor an unanchored endpoint of a unfinished path segment if multiple candidate snap locations are within a predetermined proximity to the unanchored endpoint.

In another embodiment, suggested candidate snap location 304 causes the unanchored endpoint of the unfinished path segment being created to automatically move to the suggested candidate snap location. Automatic selection of the suggested candidate snap location by the unanchored endpoint of the unfinished path segment does not automatically anchor the unanchored endpoint at the suggested candidate snap location. A user is free to continue moving the unanchored endpoint of the unfinished path segment after the automatic selection of the suggested candidate snap location if they do not want the endpoint anchored at the suggested location. It is not until the user clicks using the drawing tool that the unanchored endpoint of an unfinished path segment being created is anchored. Once the unanchored endpoint of an unfinished path segment is anchored, the path segment becomes a newly created path segment. In further embodiments, when an endpoint of a created path segment is moved, the endpoint being adjusted is treated in the same manner as an unanchored endpoint of an unfinished path segment being created and can have candidate snap locations automatically suggested within a predetermined proximity of the moved path segment endpoint.

In further embodiments, suggested candidate snap location 304 output by candidate selection engine 108 can also include instructions to display an associated axis of symmetry for the suggested candidate snap location via user interface 116. Candidate selection engine 108 can interact with path segment buffer 110 to determine the axis of symmetry associated with the suggested candidate snap location using information stored in candidate snap location list 114. For instance, if the suggested candidate snap location is point 2, candidate selection engine 108 could utilize the information in candidate snap location list 114 to determine the associated axis to display to the user via user interface 116 for point 2. A displayed associated axis of symmetry can be around, for example, an endpoint or through the perpendicular bisector of a created path segment. The axis of symmetry depicts that if an endpoint of a created path segment was reflected across the axis of symmetry, ending the unfinished path segment at the suggested candidate snap location would create a reflected symmetrical point. If there are multiple points with different associated axes of symmetry that are at the same candidate snap location, candidate selection engine 108 can include in suggested candidate snap location 304 instructions to display the multiple axes of symmetry. For example, both a horizontal and vertical axis of symmetry can be shown at the same time if the candidate snap location is a point where there is both horizontal and vertical symmetry. In an embodiment, candidate selection engine 108 can limit the number or direction (e.g. horizontal, vertical, diagonal) of the axes of symmetry instructed to be displayed to a user via user interface 116 by suggested candidate snap location 304.

Suggested candidate snap location 304 can also include values for path segment parameters such as weight, color, and curvature. This parameter indicates properties of the created path segment from which an endpoint was reflected to create the suggested candidate snap location. The parameter can be utilized to reflect the properties of a previously created path segment to a newly created path segment if an unanchored endpoint is placed at the suggested candidate snap location. For instance, if the previously created path segment has a curve, the parameter can include a curvature parameter that is reflected to the newly created path segment upon selection of the suggested candidate snap location as an anchored endpoint location. This is described further with reference to FIG. 7.

When the unanchored endpoint of an unfinished path segment being created moves at least one pixel, user movement 302 can be detected by candidate selection engine 108 and process 300 is repeated. As such, when a user moves the unanchored endpoint of an unfinished path segment being created, candidate selection engine 108 can compare the changed position of the unanchored endpoint of the unfinished path segment being created with the candidate snap locations in candidate snap location list 114 stored in path segment buffer 110. It should be appreciated that when a candidate snap location is automatically suggested as a location to anchor an unanchored endpoint, if the user movement moves away from the candidate snap location, the unanchored endpoint can stay at the candidate snap location until the user movement is outside of the predetermined proximity for the candidate snap location.

Figure 4:
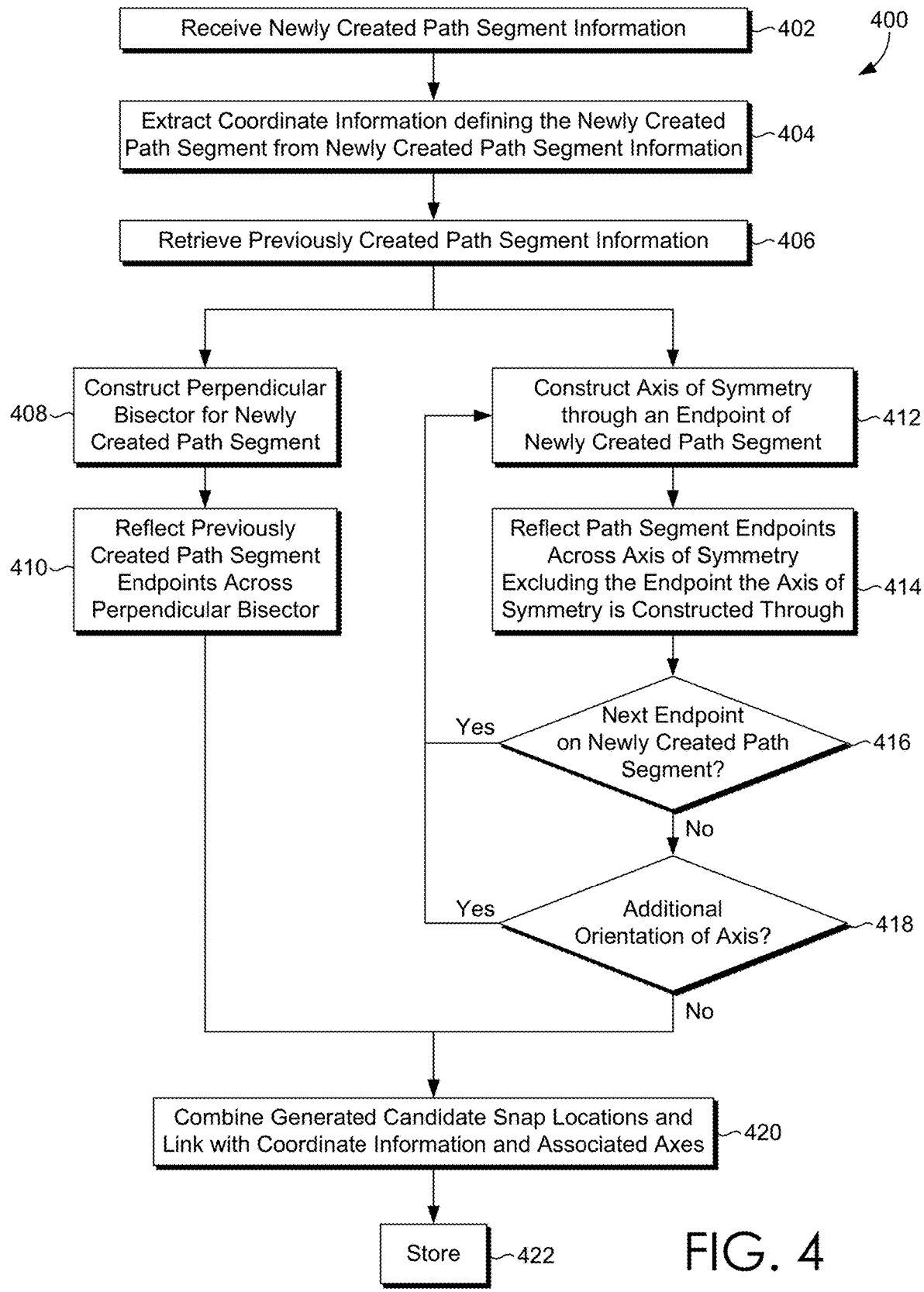
FIG. 4 illustrates a process flow depicting an example candidate snap location generation process, in accordance with various embodiments of the present disclosure.

FIG. 4 illustrates a process flow 400 depicting an example process for generating candidate snap locations when a newly created path segment is added in a digital media editing environment (e.g. digital media editor 102), in accordance with various embodiments of the present disclosure. Process flow 400 could be carried out, for example, by candidate generation engine 106 of FIGS. 1 and 2.

As depicted, process flow 400 begins at block 402 where information about a newly created path segment is received. Such information can be received, for example, when a user anchors the unanchored endpoint of an unfinished path segment being created in a digital media editing environment (e.g. digital media editor 102) by releasing a drawing tool. The drawing tool can include any vector drawing tool, for instance, the pen tool in ADOBE® Illustrator.

At block 404, newly created path segment information corresponding to the newly created path segment is received. For example, such information can be received after it is extracted from the information received at block 402. In embodiments, this information includes the coordinates of the endpoints of the newly created path segment. In further embodiments, this information can include a value for at least one path segment parameter of the newly created path segment. Such parameters can include weight, color, and curvature of the newly created path segment.

At block 406, path segment information corresponding to previously created path segments is retrieved for use in generating candidate snap locations in relation to the newly created path segment. Such information can be retrieved from a buffer (e.g. path segment location list 112 stored in path segment buffer 110) and can include the coordinates of the endpoints for previously created path segments. In further embodiments, such information can also include a value for at least one path segment parameter of the previously created path segments. Such parameters can include weight, color, and curvature.

Once the newly created path segment information and previously created path segment information is extracted, this information can be compiled to generate candidate snap locations. Candidate snap locations can be generated by reflecting endpoints across axes of symmetry. In an embodiment, an axis of symmetry can be constructed at the perpendicular bisector of the newly created path segment. In another embodiment, an axis of symmetry can be constructed at one or both of the endpoints of the newly created path segment (e.g. a horizontal or vertical axis of symmetry).

Generating candidate snap locations utilizing multiple axes of symmetry can be accomplished in parallel fashion, as such, the process flow after block 406 splits into two streams, one for determining candidate snap locations across the perpendicular bisector of a newly created path segment and one for determining candidate snap locations using axes of symmetry at the endpoints of the newly created path segment. However, it will also be appreciated that such a process can also be executed in a sequential fashion.

At block 408, an axis of symmetry is constructed at the perpendicular bisector for the newly created path segment. This perpendicular bisector axis of symmetry is constructed by determining the bisector of the newly created path segment utilizing the coordinates of the endpoints extracted from the newly created path segment information. At the determined bisector, an axis of symmetry is constructed that is perpendicular in relation to the orientation of the newly created path segment. Moving to block 410, the endpoints of the previously created path segments are reflected across the axis of symmetry at the perpendicular bisector of the newly created path segment. The locations where the previously created path segment endpoints reflect to across the axis of symmetry of the newly created path segment are candidate snap locations.

The parallel path for determining candidate snap locations using an axis of symmetry at the endpoints of the newly created path segment begins at block 412. At block 412, an axis of symmetry is constructed through one of the endpoints of the newly created path segment. The orientation of such an axis of symmetry can be determined prior to generation of the candidate snap locations. For example, a user can indicate what orientation such axis should have; the axis of symmetry can be, for instance, a horizontal axis of symmetry, a vertical axis of symmetry, a diagonal axis of symmetry at a predetermined angle, or at an angle related to other segments already drawn, such as if a number of path segments in a drawing are tilted at 30 degrees from vertical, that could be a potential axis of symmetry for other parts of the drawing. In one embodiment, the horizontal or vertical axis of symmetry is in relation to the overall design and not in relation to an individual path segment created at an angle within the design. The axis of symmetry can also be in relation to a path segment so that a horizontal or vertical axis of symmetry is horizontal or vertical in relation to the path segment and not the overall design.

Moving to block 414, the endpoints of previously created path segments are reflected across the axis of symmetry. The locations that the endpoints of the previously created path segments reflect to across the axis of symmetry are candidate snap locations. Additionally, the endpoint of the newly created path segment opposite to the endpoint where the axis of symmetry was constructed can be reflected across the axis of symmetry to generate a candidate snap location.

The process then moves to block 416 where a determination is made as to whether candidate snap locations need to be generated for the other endpoint on the newly created path segment. If the result of the decision at block 416 is in the affirmative, then processing can return to block 412 where an axis of symmetry is constructed through the next endpoint. The orientation of the axis of symmetry can be the same as the axis constructed through the first endpoint of newly created path segment. If the result of the decision at block 416 is in the negative, then processing moves on to block 418. A negative result at block 416 could occur, for example, in embodiments where there is only one "new" endpoint on a newly created path segment to generate candidate snap locations for because the other endpoint was already considered when generating candidate snap locations from the previously created path segment that shares the other endpoint with the newly created path segment (e.g. path segment 118 shares endpoint 122 with unfinished path segment 124).

At block 418, a determination is made as to whether to utilize an additional axis of symmetry at another orientation for generating candidate snap locations. For example, if a horizontal axis was already utilized, a vertical axis could be utilized next. If the determination at block 418 is in the affirmative, then processing can return to block 412 where the process is repeated utilizing the new axis of symmetry. If the determination at block 418 is in the negative, then processing continues onto block 420.

At block 420 the candidate snap locations generated at block 410 and block 414 can be combined and linked with coordinate information and associated axes. Coordinate information can include the coordinates of the candidate snap location and a value for at least one path segment parameter of the created path segment that the endpoint was reflected from to generate the candidate snap location such as weight, color, and curvature. The associated axis is the axis of symmetry across which an endpoint from a created path segment was reflected to create the candidate snap location. Finally, at block 422, the linked candidate snap locations can be numbered and stored in a list (e.g. candidate snap location list 114 is updated).

Figure 5:
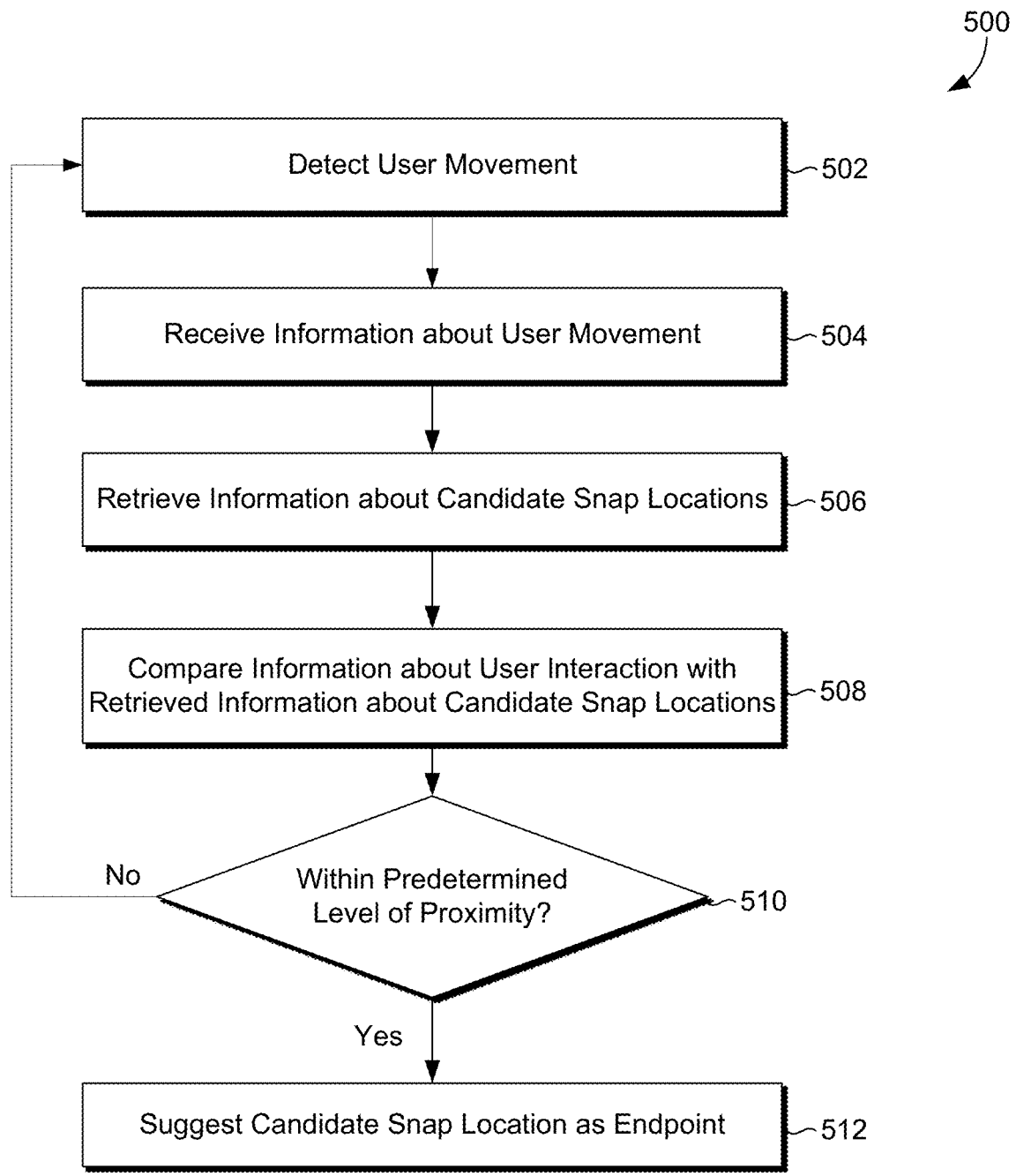
FIG. 5 illustrates a process flow depicting an example user interaction snapping process, in accordance with various embodiments of the present disclosure.

FIG. 5 illustrates a process flow 500 depicting an example process for suggesting a candidate snap location for the placement of an unanchored endpoint of an unfinished path segment being created based on the proximity of a user interaction to a candidate snap location, in accordance with various embodiments of the present disclosure. Process flow 500 could be carried out, for example by candidate selection engine 108 of FIGS. 1 and 3.

As depicted, process flow 500 begins at block 502 where information about a user interaction is detected. Such information can be detected, for example, when a user begins to create a path segment in a digital media editing environment (e.g. digital media editor 102). At block 504 information about the user interaction is received. In embodiments, such information can include the location of an anchored endpoint and an unanchored endpoint of the unfinished path segment.

At block 506, previously stored information about candidate snap locations is retrieved. Such information can be retrieved from a candidate snap location list within a path segment buffer (e.g. candidate snap location list 114 within path segment buffer 110). This information can include the candidate snap location number, coordinate information such as the coordinates of the candidate snap location and a value for at least one path segment parameter of the created path segment from which the endpoint was reflected to generate the candidate snap location such as weight, color, and curvature of the path segment, and the associated axis of symmetry.

At block 508, the location of the unanchored endpoint of the unfinished path segment being created is compared to the extracted candidate snap locations. This comparison can be performed by a candidate selection engine (e.g. candidate selection engine 108). The process then moves to block 510 where a determination is made as to whether the unanchored endpoint of the unfinished path segment being created is within a predetermined proximity to a candidate snap location. If the result of the decision at block 510 is in the negative, processing can return to block 502 where a new location of the user interaction can be analyzed for proximity to candidate snap locations. If, on the other hand, the result of the decision at block 510 is in the affirmative, then processing can proceed to block 512.

At block 512, when a user interaction is determined to be within a predetermined proximity of a candidate snap location, instructions are sent to suggest the candidate snap location as a location to anchor the unanchored endpoint of the unfinished path segment being created. In a first embodiment, the candidate snap location is suggested by automatically moving the unanchored endpoint of the unfinished path segment to the suggested candidate snap location. It should be appreciated that automatically selecting the suggested candidate snap location does not anchor the unanchored endpoint of the unfinished path segment at the candidate snap location. A user is free to continue moving the unanchored endpoint of the unfinished path segment if the user does not want the unanchored endpoint of the unfinished path segment anchored at the automatically selected candidate snap location. In another embodiment, the candidate snap location is suggested by displaying the candidate snap location to a user who can then move the unanchored endpoint of the unfinished path segment being created to the suggested candidate snap location if the candidate snap location is where the user wants to anchor the unanchored endpoint.

In embodiments, the axis of symmetry for the suggested candidate snap location can also be displayed to the user via a user interface (e.g. user interface 116). For example, the axis of symmetry can be around a horizontal or vertical axis of symmetry at an endpoint of a created path segment or around a perpendicular bisector of a created path segment. The axis depicts that if an endpoint of a created path segment was reflected across the axis of symmetry, ending the unfinished path segment at the suggested candidate snap location would create a reflected symmetrical point across the axis of symmetry. Multiple axes of symmetry can be displayed to a user at the same time. For example, both a horizontal and vertical axis of symmetry can be shown at the same time if the candidate snap location is a point where there is both horizontal and vertical symmetry. Anywhere where there is potential symmetry can be shown to the user by displaying multiple axes of symmetry. In an embodiment, the number or direction (e.g. horizontal, vertical, diagonal) of axes of symmetry displayed to a user when a path segment endpoint is suggested to end at a candidate snap location can be limited based on predefined criteria. Such criteria can include a maximum number of axes displayed or only displaying only axes of symmetry in a specific direction (e.g. only horizontal axes of symmetry). In addition to displaying axes of symmetry, information stored with a candidate snap location can be used to highlight the endpoint that was reflected to generate the candidate snap location. More than one endpoint can be highlighted if multiple endpoints are reflected across multiple axes of symmetry.

When an unanchored endpoint of an unfinished path segment being created moves at least one pixel, user interaction 502 is redetected and process 500 is repeated. This means that when a user moves an unanchored endpoint of an unfinished path segment being created to a changed position, the location of the unanchored endpoint of the unfinished path segment being created is checked against the list of candidate snap locations.

Figure 6:
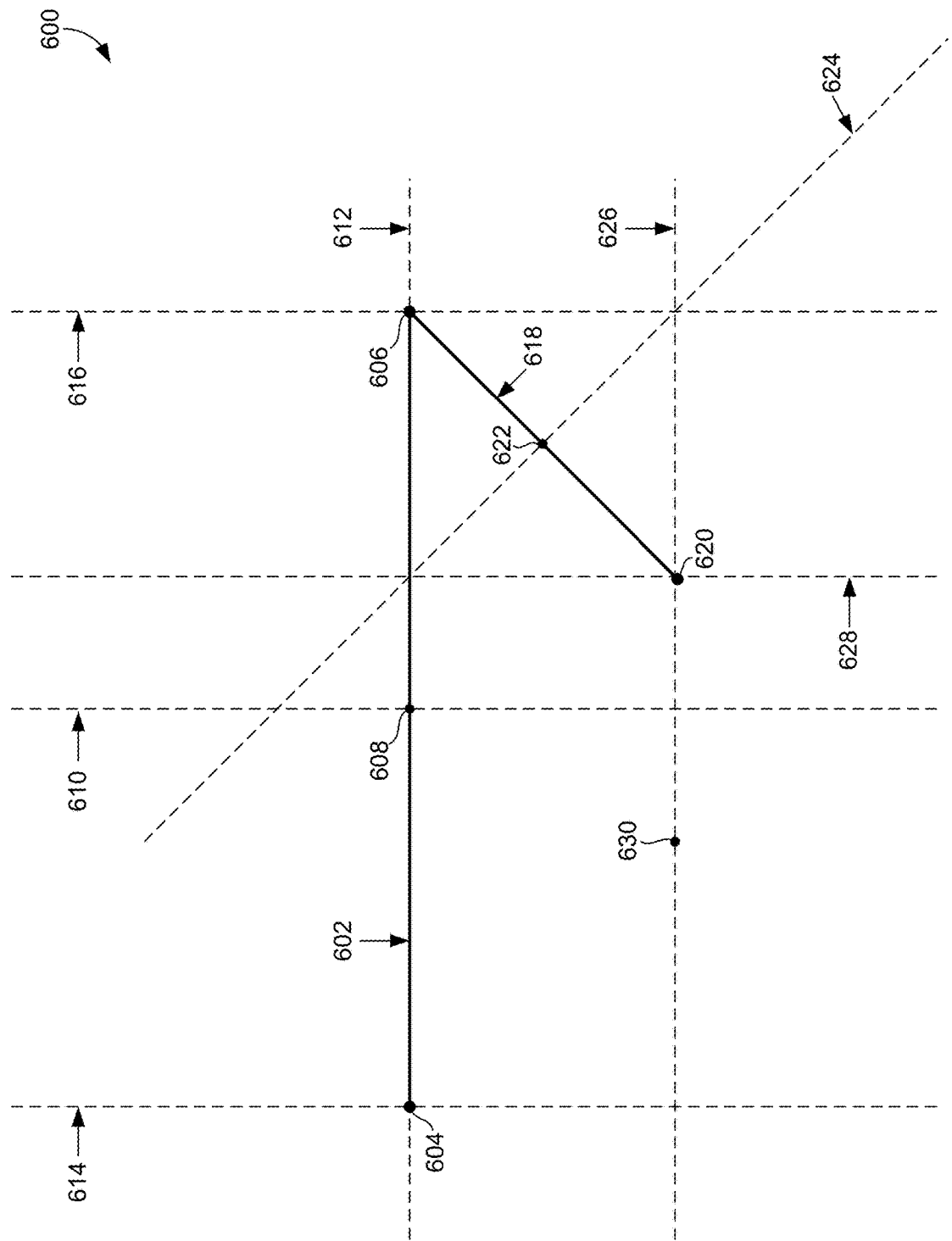
FIG. 6 is a graphical depiction of an illustrative display of perpendicular bisector axes of symmetry and endpoint axes of symmetry for two path segments, in accordance with various embodiments of the present disclosure.

FIG. 6 is a graphical depiction of an illustrative display of bisector axes of symmetry and endpoint axes of symmetry for two path segments, in accordance with various embodiments of the present disclosure. As depicted, at 600 the display includes a first path segment 602 and a second path segment 618.

Path segment 602 has endpoint 604 and endpoint 606. In the depicted embodiment, perpendicular bisector axis of symmetry 610 for path segment 602 is shown. In addition, vertical axis of symmetry 614 and horizontal axis of symmetry 612 for endpoint 604 are displayed. Also displayed are vertical axis of symmetry 616 and horizontal axis of symmetry 608 for endpoint 606.

Path segment 618 has endpoint 606 and endpoint 620. In some embodiments of the present invention, only horizontal and vertical path segments have a perpendicular bisector axis of symmetry constructed around which endpoints are reflected to generate candidate snap locations. In the depicted embodiment, perpendicular bisector axis of symmetry 624 for path segment 618 is shown even though path segment 618 is not a horizontal or vertical path segment. Vertical axis of symmetry 614 and horizontal axis of symmetry 608 for endpoint 606 are displayed. Also displayed are vertical axis of symmetry 628 and horizontal axis of symmetry 626 for endpoint 620. As depicted in this embodiment, horizontal and vertical axes at the endpoints are horizontal and vertical with respect to the overall image and not with respect to the individual path segments created.

Axes of symmetry 610, 612, 614, 616, 620, 622, 624, 626, and 628 are potential axes of symmetry across which an endpoint can be reflected to create a candidate snap location. For example, point 630 represents the candidate snap location where endpoint 620 is reflected across perpendicular bisector axis of symmetry 610. If an unanchored endpoint of a path segment being created is snapped to point 630, then perpendicular bisector axis of symmetry 610 can also be displayed to a user. Bisector axis of symmetry 610 can be displayed to a user via a user interface (e.g. user interface 116).

Figure 7:
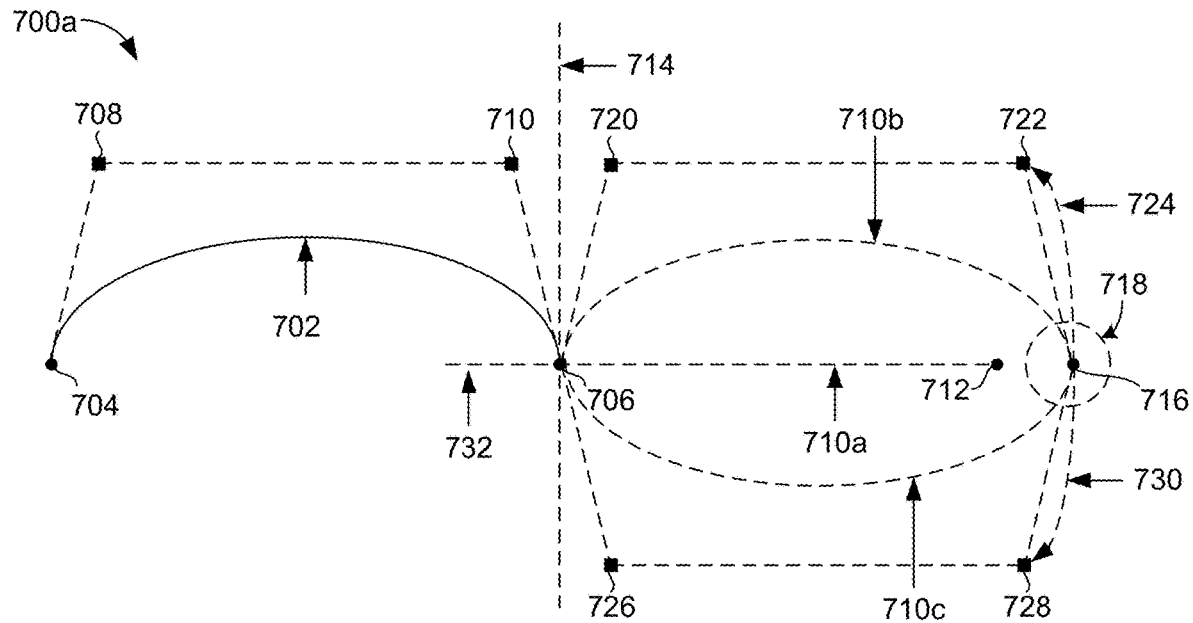
FIG. 7 is a graphical depiction of an illustrative display of utilizing a curvature parameter from control information associated with a suggested candidate snap location to create a second path segment reflecting the same curve as a first path segment, in accordance with various embodiments of the present disclosure.
Figure 7:
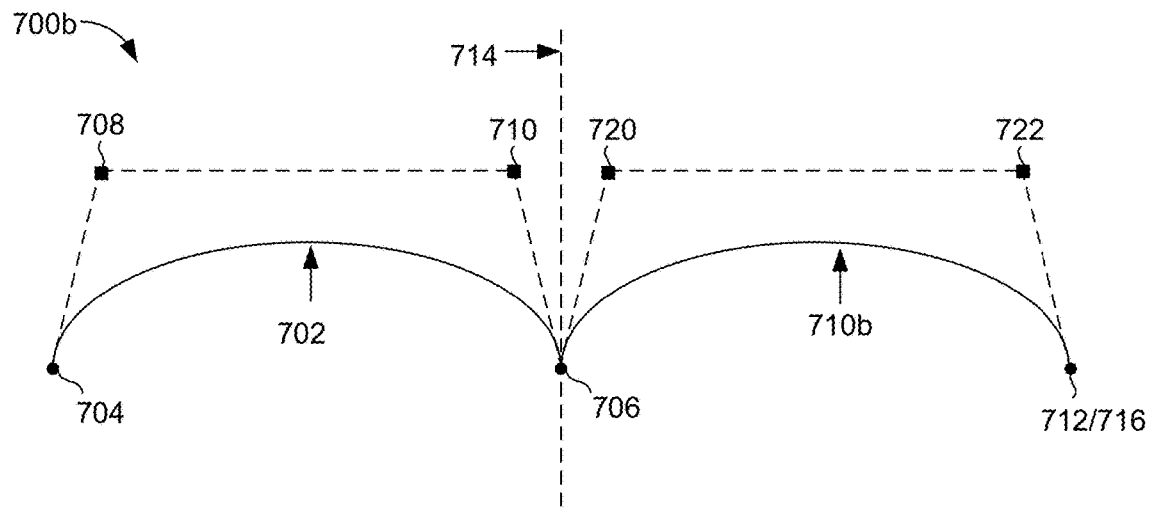

FIG. 7 is a graphical depiction of an illustrative display of utilizing a curvature parameter from control information associated with a suggested candidate snap location to create a second path segment reflecting the same curve of a first path segment, in accordance with various embodiments of the present disclosure. As depicted, at 700a the display includes created path segment 702 and unfinished path segment 710a for which the second endpoint has not yet been anchored. At 700b, the display includes created path segment 702 and newly created path segment 710b for which the second endpoint has been anchored utilizing a suggested candidate snap location with linked control information to reflect the curve of path segment 702 to path segment 710b.

Path segment 702 has endpoint 704 and endpoint 706. In this depiction, at endpoint 706, vertical axis of symmetry 714 has been constructed. It should be appreciated that additional axes of symmetry can also be constructed and the vertical axis of symmetry is exemplary. When endpoint 704 is reflected across vertical axis of symmetry 714, candidate snap location 716 is generated. Predetermined proximity 718 is depicted around candidate snap location 716. In this embodiment, predetermined proximity is not displayed to a user; however, it should be appreciated that in further embodiments it can be displayed. Predetermined proximity 718 is the area within which a user interaction must occur for candidate snap location 716 to be suggested as an endpoint for an unfinished path segment. For example, the user interaction can be moving an unanchored endpoint as indicated by detecting movement of a mouse, a finger, or another input device. As depicted, path segment 710a is being created with endpoint 704 anchored and endpoint 712 unanchored.

When a user interaction moves endpoint 712 within predetermined proximity 718, candidate snap location 716 can be suggested as an anchored endpoint. If candidate snap location 716 is selected as the anchored endpoint, control information linked with candidate snap location can be applied to path segment 710a, In the displayed embodiment, the linked control information includes a curvature parameter. The curvature parameter can include control points associated with a curve. It should be appreciated that a curvature parameter can also equal zero (e.g. for a straight path segment). Control information can also include parameters such as path segment weight and color.

As depicted, path segment 702 has associated control points 708 and 710. Upon anchoring an endpoint at a suggested candidate snap location, a user interaction can indicate movement from a selected candidate snap location to a control point to show a desire to reflect a curve associated with the selected candidate snap location. Such a user interaction can be the completion of a drag gesture from the anchored endpoint after the user anchors the unanchored endpoint to a curvature control point. For instance, after selecting candidate snap location as anchored endpoint 712 of path segment 710a, user interaction indicating movement 724 up to control point 722 can result in path segment 710b, Path segment 710b is the reflection of path segment 702 across axis of symmetry 714. Alternatively, user interaction indicating movement 730 to control point 728 can result in path segment 710c, Path segment 710c is generated using the reflection of control points 720 and 722 across axis of symmetry 732.

As such, it should be appreciated that control points can be treated similarly to path segment endpoints where control points can be reflected across axis of symmetry to generate candidate control points of symmetry. Such candidate control points can be associated with generated candidate snap locations. For instance, once an endpoint is anchored at a suggested candidate snap location, while a user is dragging to a control point location, further candidate control points can be suggested that mirror or otherwise relate to control points on the original path segment that was used to determine the candidate snap location.

In a further embodiment, after a user anchors an unanchored endpoint at a suggested candidate snap location, if the user drags to a control point, two points can be suggested as candidate control points. For instance, one at control point 722, and another at control point 728. If the user drags near 722 and allows the control point to snap there, a "top of a heart" curve as shown by 710*b* results, whereas if the user drags near 728, a S-curve as shown by 710*c* results.

As depicted, there are two control points for a curve. It should be appreciated that for other types of curves, only one control point can be used—for example, in a quadratic Bezier curve. Additionally, not all curves are themselves symmetrical. FIG. 7 depicts a cubic Bezier curve; other types of curves such as a B-splines curve can be generated and reflected using control points as described without the curve itself being symmetrical.

If a path segment has multiple associated control points, an inference can be made to apply all control points when a user gestures or drags to one of the control points. For instance, in the depicted cubic Bezier curve, an inference can be made about control point 720 when a user gestures to control point 722 to select both control points, resulting in path segment 710*b* dipping down symmetrically (i.e., the control points for path segment 710*b* reflect control points 708 and 710 of curve 702 resulting in curve 710*b* reflecting curve 702). While there are only two control points described, this type of inference can be made for any number of associated control points to produce a reflected curve.

Figure 8:
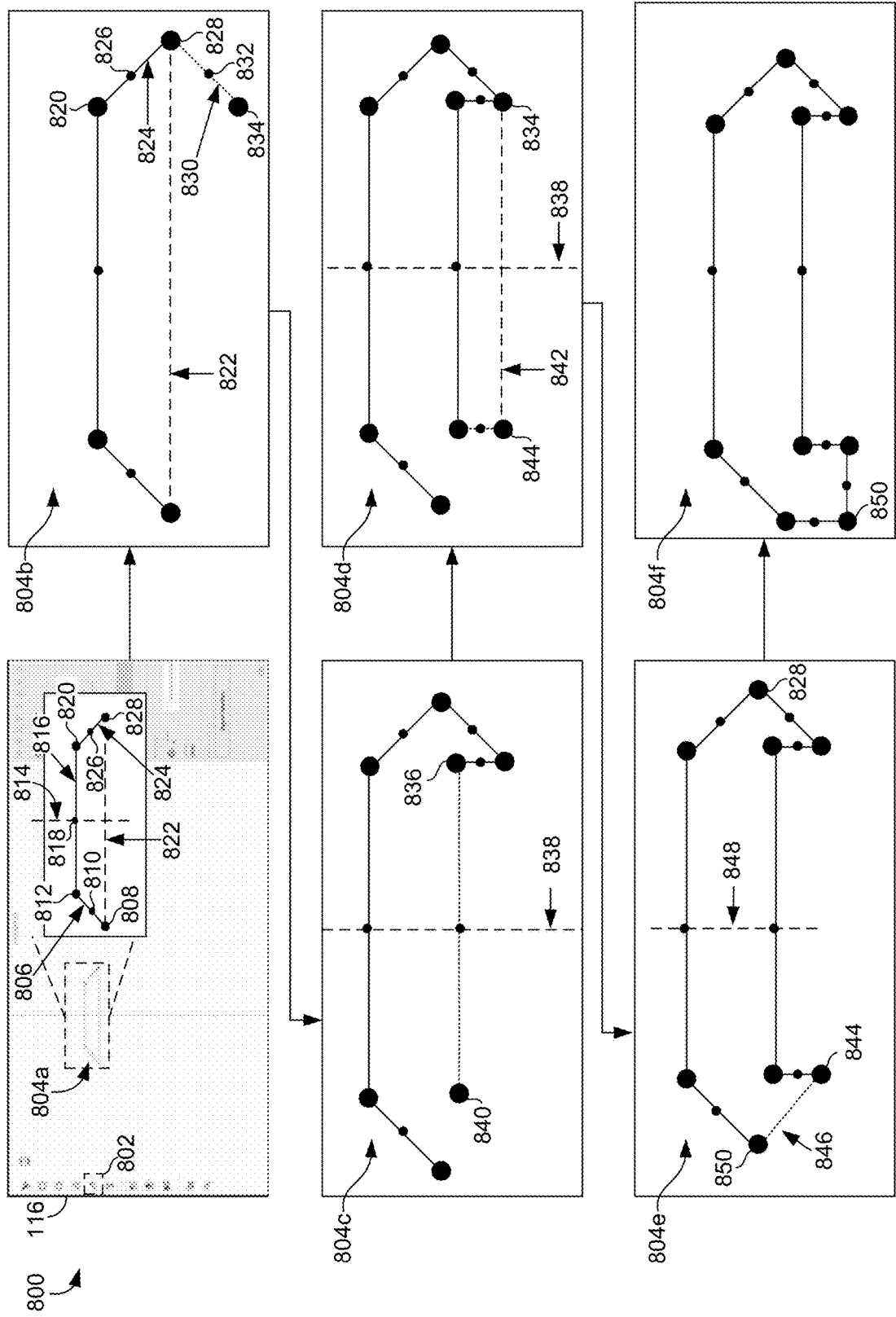
FIG. 8 is a graphical depiction of an illustrative user interface depicting the creation of a vector image using mirror snapping to candidate snap locations to create a highly symmetrical shape, in accordance with various embodiments of the present disclosure.

FIG. 8 is a graphical depiction of an illustrative user interface depicting the creation of a vector image using mirror snapping to candidate snap locations to create a symmetrical shape, in accordance with various embodiments of the present disclosure. As depicted, at 800, path segments created using mirror snapping to create a symmetrical shape are displayed on user interface 116.

Pen tool 802 can be selected to create path segments to construct shape 804. For example, pen tool 802 was used to draw created path segment 806 with endpoint 808, bisector 810, and endpoint 812. Created path segment 816 shares endpoint 812 with created path segment 806 and also has endpoint 820. In addition, in shape 804*a*, newly created path segment 824 can be created using pen tool 802. As depicted in 804*a*, final anchored endpoint 828 of newly created path segment 824 has just been selected. While being created, unfinished path segment 824 shares endpoint 820 with path segment 816 and also had an unanchored endpoint 828. Unanchored endpoint 828 could be moved by a user to a desired final endpoint. In embodiments, when unanchored endpoint 828 comes within a predetermined proximity to a candidate snap point, that candidate snap point can be automatically selected for unanchored endpoint 828. In shape 804*a*, the location of anchored endpoint 828 is at the candidate snap location created when endpoint 808 is reflected across perpendicular bisector axis of symmetry 814 from path segment 816. This depiction also displays that anchored endpoint 828 is also in line with endpoint 808, indicated by path segment 822.

When a newly created path segment is added to an image, it can be referred to along with previously create path segments as created path segments. In shape 804*b*, path segment 824 (newly created path segment 824 in 804*a*) can be referred to as a created path segment 824. Shape 804*b* depicts the image that occurs when unanchored endpoint 834 of unfinished path segment 830 is automatically selected to a suggested candidate snap location reflected by endpoint 820 across horizontal axis of symmetry 822 at endpoint 828.

Shape 804*c* similarly depicts the image that occurs when unanchored endpoint 840 is automatically selected to suggested candidate snap location reflected by endpoint 836 across perpendicular bisector axis of symmetry 838. Shape 804*d* further depicts the image that occurs when unanchored endpoint 844 is automatically selected to a candidate snap location that is reflected by endpoint 834 across perpendicular bisector axis of symmetry 838. Also displayed in shape 804*d* is unanchored endpoint 844 in line with endpoint 834, indicated by path segment 842.

Shape 804*e* depicts automatically selecting unanchored endpoint 850 to a suggested candidate snap location created when endpoint 828 is reflected across perpendicular bisector axis of symmetry 848. However, as seen in shape 804*f*, the automatically selected to candidate snap location in shape 804*e* for unanchored endpoint 850 is not the final anchored location for endpoint 850 of path segment 846. This depicts how a user can choose not to anchor an unanchored endpoint of an unfinished path segment at an automatically selected suggested candidate snap location and can instead anchor the unanchored endpoint at a different location. Shape 804*f* also depicts how a highly, but not fully, symmetrical image can be generated by a user.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
   receiving a path segment of an image, the path segment having an unanchored endpoint;
   identifying a candidate snap location based on a symmetrical analysis of one or more previously created path segments in relation to the unanchored endpoint of the path segment, wherein the candidate snap location identifies a potential path segment endpoint for the unanchored endpoint; and
   indicating the candidate snap location as a suggested anchored endpoint for the unanchored endpoint to cause the path segment to have symmetry with at least one of the one or more previously created path segments.

2. The computer-implemented method of claim 1, further comprising:
   receiving an indication to select the suggested anchored endpoint as an anchored endpoint for the path segment; and
   upon receiving the indication to select the suggested anchored endpoint, selecting the suggested anchored endpoint as an anchored endpoint for the path segment.

3. The computer-implemented method of claim 1, wherein the candidate snap location is stored to include at least one path segment parameter that corresponds to one or more properties of a previously created path segment endpoint from which the candidate snap location was generated.

4. The computer-implemented method of claim 1, further comprising:
   upon selection of the suggested anchored endpoint as an anchored endpoint for the path segment, applying one or more properties to the path segment, wherein the one or more properties correspond to a previously created path segment endpoint from which the candidate snap location was generated.

5. The computer-implemented method of claim 4, wherein the one or more properties comprise weight, color, and curvature.

6. The computer-implemented method of claim 2, further comprising:
   identifying candidate control points based on a further symmetrical analysis of the one or more previously created path segments, wherein a candidate control point identifies a potential curve for the path segment; and
   upon selecting the suggested anchored endpoint as the anchored endpoint for the path segment, indicating a control point related to a suggested curve for the path segment.

7. The computer-implemented method of claim 6, wherein the further symmetrical analysis of the one or more previously created path segments comprises:
   constructing an axis through at least one of the one or more previously created path segments;
   reflecting at least one control point of the one or more previously created path segments across the axis;
   identifying one or more reflected control points as the candidate control points; and
   storing coordinate information for the identified candidate control points in a list of candidate control points.

8. The computer-implemented method of claim 2, further comprising:
   receiving a further indication of movement from the anchored endpoint to a control point, wherein the movement to the control point causes the path segment to reflect a curve associated with the candidate snap location.

9. The computer-implemented method of claim 1, wherein the suggested anchored endpoint is indicated in response to a user interaction within a predetermined proximity to the candidate snap location.

10. The computer-implemented method of claim 1, wherein the symmetrical analysis of the one or more previously created path segments comprises:
    constructing an axis through at least one of the one or more previously created path segments;
    reflecting at least one endpoint of the one or more previously created path segments across the axis;
    identifying one or more reflected endpoints as candidate snap locations; and
    storing coordinate information for the identified candidate snap locations in a list of candidate snap locations, the list of candidate snap locations for use in generating path segments with symmetry within the image being generated by the user.

11. One or more non-transitory computer-readable storage media having instructions stored thereon, which, when executed by one or more processors of a computing device, cause the computing device to:
    receive a path segment of an image, the path segment having an unanchored endpoint;
    identify a candidate snap location based on a symmetrical analysis of one or more previously created path segments in relation to the unanchored endpoint of the path segment, wherein the candidate snap location identifies a potential path segment endpoint for the unanchored endpoint; and
    indicate the candidate snap location as a suggested anchored endpoint for the unanchored endpoint to cause the path segment to have symmetry with at least one of the one or more previously created path segments.

12. The one or more non-transitory computer-readable storage media of claim 11, the instructions further cause the computing device to:
    receive an indication to select the suggested anchored endpoint as an anchored endpoint for the path segment; and
    upon receiving the indication to select the suggested anchored endpoint, select the suggested anchored endpoint as an anchored endpoint for the path segment.

13. The one or more non-transitory computer-readable storage media of claim 11, the instructions further cause the computing device to:
    upon selection of the suggested anchored endpoint as an anchored endpoint for the path segment, apply one or more properties to the path segment, wherein the one or more properties correspond to a previously created path segment endpoint from which the candidate snap location was generated.

14. The one or more non-transitory computer-readable storage media of claim 12, the instructions further cause the computing device to:
    identify candidate control points based on a further symmetrical analysis of the one or more previously created path segments, wherein a candidate control point identifies a potential curve for the path segment; and
    upon selecting the suggested anchored endpoint as the anchored endpoint for the path segment, indicate a control point related to a suggested curve for the path segment.

15. The one or more non-transitory computer-readable storage media of claim 14, wherein the symmetrical analysis of the one or more previously created path segments comprises:
- constructing an axis through at least one of the one or more previously created path segments;
- reflecting at least one control point of the one or more previously created path segments across the axis;
- identifying one or more reflected control points as the candidate control points; and
- storing coordinate information for the identified candidate control points in a list of candidate control points.

16. The one or more non-transitory computer-readable storage media of claim 12, the instructions further cause the computing device to:
- receive a further indication of movement from the anchored endpoint to a control point, wherein the movement to the control point causes the path segment to reflect a curve associated with the candidate snap location.

17. The one or more non-transitory computer-readable storage media of claim 11, wherein the symmetrical analysis of the one or more previously created path segments comprises:
- constructing an axis through at least one of the one or more previously created path segments;
- reflecting at least one endpoint of the one or more previously created path segments across the axis;
- identifying one or more reflected endpoints as candidate snap locations; and
- storing coordinate information for the identified candidate snap locations in a list of candidate snap locations, the list of candidate snap locations for use in generating path segments with symmetry within the image being generated by the user.

18. A computing system comprising:
- means for receiving a path segment with an unanchored endpoint;
- means for identifying a candidate snap location based on a symmetrical analysis of one or more previously created path segments in relation to the unanchored endpoint of the path segment, wherein the candidate snap location identifies a potential path segment endpoint for the unanchored endpoint; and
- means for indicating the candidate snap location as a suggested anchored endpoint for the unanchored endpoint to cause the path segment to have symmetry with at least one of the one or more previously created path segments.

19. The computing system of claim 18, further comprising:
- means for identifying candidate control points based on a further symmetrical analysis of the one or more previously created path segments, wherein a candidate control point identifies a potential curve for the path segment.

20. The computing system of claim 18, further comprising:
- means for applying one or more properties to the path segment, wherein the one or more properties correspond to a previously created path segment endpoint from which the candidate snap location was generated.

* * * * *